Patented Oct. 14, 1941

2,258,870

UNITED STATES PATENT OFFICE 2,258,870

PHENOLIC ESTERS OF CARBONIC DERIVATIVES OF ALPHA-HYDROXYISOBUTYRIC ACID

Jack T. Thurston, Cos Cob, and Donald W. Kaiser, Springdale, Conn., assignors to American Cyanamid Company, New York, N. Y., a corporation of Maine No Drawing. Application November 6, 1940, Serial No. 364,556

10 Claims. (Cl. 260—463)

The present invention relates to a new class of chemical compounds comprising the phenolic esters of the carbonic derivatives of alpha-hydroxyisobutyric acid.

Many of these new compounds are useful as modifiers and plasticizers in various resinous compounds.

Compounds of this invention may be represented by the following general formula:

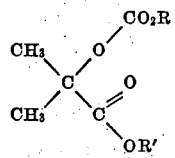

in which R may be an alkyl, aralkyl, carbocyclic or heterocyclic radical and R' is an aryl radical.

A general method for producing the compounds of the present invention comprises reacting a carbonic derivative of alpha-hydroxyisobutyric acid with a phenolic or hydroxy aryl compound. We have found that the hydroxyl group of phenolic compounds will not react with the carboxyl group of alpha-hydroxyisobutyric acid to form esters when it is attempted to carry out the reaction using the ordinary esterification process. Similarly we have found that the alpha-acetoxy, alpha-formyloxy or similar acyl derivatives of alpha-hydroxyisobutyric acid will not react with phenolic compounds to produce esters. We have found, however, that the phenolic esters of alpha-carbonic derivatives of alpha-hydroxyisobutyric acid can be prepared and this class of compounds represents the subject matter of the present invention.

In general the method of preparing the compounds of the present invention comprises reacting a compound such as (alpha-carboxy) oxyisobutyryl chloride with a compound such as phenol. While we prefer to use ethyl or methyl chloroformate derivatives of alpha-hydroxyisobutyric acid in producing the compounds of our invention, we may use any chloroformic acid ester since it is well known that any primary or secondary alcohol will react with phosgene in the cold to produce the corresponding chloroformic acid esters, any of which will react with the hydrogen of the alpha-hydroxy group in alpha-hydroxyisobutyric acid to split off HCl and produce the corresponding carbonic derivative. For example we may use phenyl chloroformate, cyclohexyl chloroformate, furfuryl chloroformate, naphthyl chloroformate, naphthylmethyl chloroformate, benzyl chloroformate, and the like.

These carbonic derivatives of alpha-hydroxyisobutyric acid when reacted with thionyl chloride result in the production of the corresponding carbonic derivatives of alpha-hydroxyisobutyryl chloride which will readily react with the hydrogen of the hydroxy aryl compounds to produce the corresponding esters.

The invention will be further described in conjunction with the following specific examples but they are for the purpose of illustration only and the invention is not strictly limited to the exact conditions set forth therein.

EXAMPLE 1

*Phenyl(alpha-carbethoxy) oxyisobutyrate*

To a solution of 12.6 g. (0.134 mol) of phenol in 15 g. (0.19 mol) of pyridine at 10° C. was slowly added, with stirring, a solution of 26 g. (0.134 mol) of (alpha-carbethoxy) oxyisobutyryl chloride in 20 g. (0.228 mol) of dioxane. After addition of the acylating agent, the mixture was allowed to stand at room temperature for six hours before it was warmed on a steam bath for one hour. The reaction mixture, after cooling, was poured into ice water containing dilute sulfuric acid. The oil was extracted with ether, washed with sodium carbonate solution and water before it was dried over sodium sulfate. The ether was removed leaving the slightly colored ester phenyl(alpha-carbethoxy) oxyisobutyrate.

EXAMPLE 2

*4-Diphenyl(alpha-carbethoxy) oxyisobutyrate*

Using the same procedure as given in Example 1, a solution of 17 g. (0.1 mol) of p-hydroxydiphenyl in 20 g. (0.25 mol) of pyridine was treated with a solution of 21.5 g. (0.11 mol) of (alpha-carbethoxy) oxyisobutyryl chloride in 20 g. (0.225 mol) of dioxane. When the solution was poured into ice cold dilute sulfuric acid a colorless solid was precipitated. Two recrystallizations from dilute methanol gave minute colorless plates of 4-diphenyl(alpha-carbethoxy) oxyisobutyrate melting at 88–90° C.

EXAMPLE 3

*4-Nitrophenyl(alpha-carbethoxy) oxyisobutyrate*

In a similar manner 27.8 g. (0.2 mol) of p-nitrophenol in 40 g. (0.505 mol) of pyridine was treated with 78 g. (0.4 mol) of (alpha-carbethoxy) oxyisobutyryl chloride in 50 g. (0.57 mol) of dioxane. Precipitation in ice cold dilute sulfuric acid gave an oil which was extracted with carbon tetrachloride. After the solution had been washed with sodium carbonate solution and water it was dried over sodium sulfate and decolorized with activated charcoal. Filtration and removal of the solvent left a light golden oil. On standing, the oil slowly crystallized to a pasty mass. After two recrystallizations from naphtha, nearly colorless, fine plates melting at 59–60° C. were obtained.

Example 4

*Phenyl(alpha-carbethoxy) oxyisobutyrate*

To 0.11 mol of sodium phenoxide suspended in 184 g. of toluene was added 0.1 mol of (alpha-carbethoxy)oxyisobutyryl chloride dissolved in 25 g. of toluene. After standing for 48 hours the reaction mixture was heated to reflux, cooled and washed with water. The dried toluene solution was then distilled at reduced pressure leaving the slightly colored phenyl(alpha-carbethoxy)oxyisobutyrate. The same procedure was repeated using p-hydroxydiphenyl and a solid, M. P. 86–88° C. was obtained.

Using procedures similar to those described above, (alpha-carbethoxy)oxyisobutyryl chloride was reacted respectively with beta-naphthol, carvocrol, resorcinol, p-bornyl phenol, o-nitrophenol, p-nitrophenol, producing compounds having properties similar to those produced in the foregoing examples.

Compounds having similar properties were also produced when other chloroformic esters were used in place of the ethyl chloroformate in the foregoing examples, and it is to be understood that the (alpha-carbethoyl)oxyisobutyryl chloride may be replaced in all or in part by the corresponding carbomethoxy, carbophenoxy, carbocyclohexyl or similar compounds.

We claim:

1. Compounds having the following general formula:

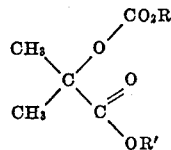

in which R is a member of the group consisting of alkyl, aralkyl, carbocyclic, and heterocyclic radicals and R' is an aryl radical.

2. Compounds having the following general formula:

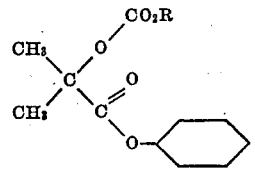

in which R is a member of the group consisting of alkyl, aralkyl, carbocyclic, and heterocyclic radicals.

3. Compounds having the following general formula:

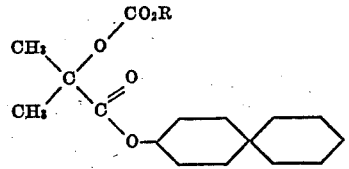

in which R is a member of the group consisting of alkyl, aralkyl, carbocyclic, and heterocyclic radicals.

4. Compounds having the following general formula:

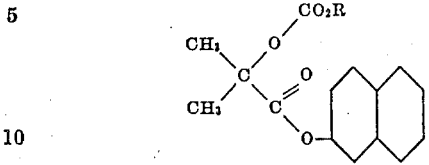

in which R is a member of the group consisting of alkyl, aralkyl, carbocyclic, and heterocyclic radicals.

5. Compounds having the following general formula:

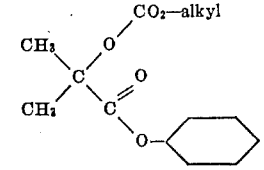

6. Compounds having the following general formula:

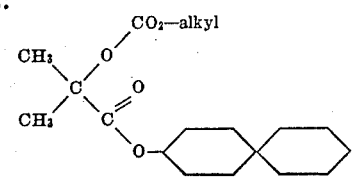

7. Compounds having the following general formula:

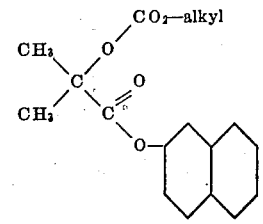

8. The compound having the formula:

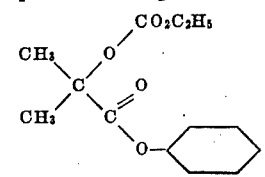

9. The compound having the formula:

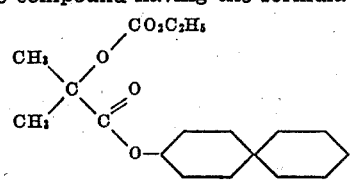

10. The compound having the formula:

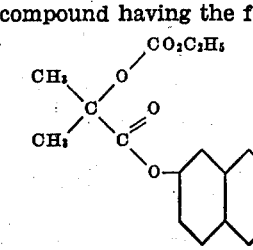

JACK T. THURSTON.
DONALD W. KAISER.